3,138,529
TETRACYCLINE ANTIBIOTIC COMPOSITIONS FOR ORAL USE
Edward Takesue, Pearl River, and Joseph John Hlavka, New City, N.Y., and James Howard Boothe, Montvale, N.J., assignors to American Cyanamid Company, New York, N.Y., a corporation of Maine
No Drawing. Filed June 29, 1961, Ser. No. 120,472
13 Claims. (Cl. 167—65)

This invention relates to novel antibiotic compositions and more particularly is concerned with the preparation of novel antibiotic compositions containing a tetracycline antibiotic and a potentiating agent therefor whereby effective blood levels of the antibiotic are obtained more rapidly, reach a higher level and are maintained over a longer period of time than would be expected following oral administration of a tetracycline antibiotic without the potentiating agent.

The use of potentiating agents or adjuvants for the purpose of enhancing the blood levels of orally administered tetracycline antibiotics has come into widespread use in recent years. Citric acid has proven to be one of the best adjuvants for increasing the rate of absorption and for enhancing serum levels of orally administered tetracycline, in the standard experimental animal, such as, the albino rat.

In accordance with the present invention we have now discovered that pyromellitic acid and trimellitic acid 1,2-anhydride are superior to the known adjuvants, such as citric acid, for increasing the blood levels in terms of tetracycline equivalents.

The tetracycline antibiotics which may be administered orally in admixture with the novel adjuvants of this invention include the known biologically active tetracyclines, among which may be mentioned tetracycline, chlortetracycline, oxytetracycline, 6 - demethylchlortetracycline, 6-demethyltetracycline, 6-deoxytetracycline, 6-demethyl-6-deoxytetracycline, 7 - bromo - 6 - demethyl-6-deoxytetracycline, 7 - chloro - 6 - demethyl - 6 - deoxytetracycline, 7 - iodo - 6 - demethyl - 6 - deoxytetracyline, 7 - nitro - 6 - demethyl - 6 - deoxytetracycline, 9 - nitro-6-demethyl-6-deoxytetracycline, 7-bromo - 6 - deoxytetracycline, 7-iodo-6-deoxytetracycline, 9-nitro-6-deoxytetracycline, 7-nitro-6-deoxytetracycline, 7-amino-6-demethyl-6 - deoxytetracycline, 9-amino-6-demethyl-6-deoxytetracycline, 9 - amino - 6 - deoxytetracycline, 9 - amino - 7-bromo - 6 - deoxytetracycline, 9 - amino - 7 - nitro - 6-deoxytetracycline, 7 - iodo - 5 - hydroxy - 6 - deoxytetracycline, 7-bromo-5-hydroxy-6-deoxytetracycline, 5 - hydroxy-6-deoxytetracycline, 9-amino-7-bromo-6-demethyl-6-deoxytetracycline, 7-bromo-9-nitro-6-demethyl-6-deoxytetracycline, 9-amino-7-chloro-6-demethyl - 6 - deoxytetracycline, 7-chloro-9-nitro-6-demethyl-6-deoxytetracycline, etc.

The expression "tetracycline antibiotic" as used throughout the specification and claims is intended to embrace any of the foregoing tetracycline compounds. It is to be understood that those tetracyclines which are commercial or potentially commercial drugs such as chlortetracycline, tetracycline, oxytetracycline, 6 - demethylchlortetracycline and 6-demethyltetracycline are especially preferred because of their ready availability and demonstrated clinical usefulness.

The tetracyclines may be used in the form of their free bases or in the more preferred form of administration as a salt thereof, particularly the hydrochloride salt.

The novel adjuvants may be used in the form of their free acids as illustrated or they may be used equally as well in the form of their simple salts such as the alkali metal or ammonium salts.

The proportion of the tetracycline antibiotic to adjuvant may vary over a fairly wide range. The adjuvant is preferably used in an amount ranging from about 1 to 3 parts by weight of the tetracycline antibiotic. As the adjuvant is much cheaper than the tetracycline antibiotic it is preferred to operate with an excess of adjuvant and optimum results will usually be obtained with an amount of adjuvant ranging from equal amounts to three times the weight of the tetracycline antibiotic.

A dosage unit form of the new compositions of this invention is most conveniently a powdered mixture of the antibiotic and the adjuvant enclosed in a gelatin capsule. The dosage unit form may contain from about 25 to 500 mg. of one of the desired tetracyclines with from 1 to 3 parts by weight of adjuvant. An inert diluent such as starch, sucrose, and magnesium stearate may be added if desired. A preferred composition consists of 250 mg. of a tetracycline antibiotic free base together with 500 to 750 mg. of adjuvant in a soft gelatin capsule. If desired, the composition may be granulated and administered as such, or may be compressed into tablets suitable for oral administration. Also, if desired, a composition can be formulated into numerous pharmaceutical substances such as pediatric drops, elixirs, and various other conventional pharmaceutical forms of medication. These will be administered by the attending physician or veterinarian in accordance with the age and condition of the patient, nature of the disease and in view of the other considerations peculiar to the individual patient.

As a consequence to evidence obtained from the standard experimental animal, that is, the albino rat, the principal utility of the compositions of this invention is expected to be as an orally administered tetracycline antibiotic composition for use in human therapy, it is also within the scope of the present invention to provide suspensions or dispersions of the tetracycline antibiotic compositions for use in the treatment of animals in which case aqueous solutions may be employed for intravenous administration or solutions or suspensions with organic solvents may be prepared for intramuscular administration.

The following examples are provided for illustrative purposes and may include particular features of the invention. However, the examples should not be construed as limiting the invention, many variations of which are possible without departing from the spirit or scope thereof.

EXAMPLE 1

A group of three albino rats ranging from 175–300 grams were dosed with a solution or suspension of 50 mg./kg. of tetracycline hydrochloride via a feeding needle. A similar group of three rats received a mixture of 50 mg./kg. of tetracycline hydrochloride plus 140 mg./kg. of citric acid. A similar group recevied 50 mg./kg. of tetracycline hydrochloride plus 140 mg./kg. of pyromellitic acid. A similar group received 50 mg./kg. of tetracycline hydrochloride plus 140 mg./kg. of trimellitic acid 1,2-anhydride. The blood levels were determined four hours after dosing. The results obtained are shown in the table below:

Table 1

| Substance | Dose, mg./kg. | Serum Levels, mcg./ml. |
|---|---|---|
| Tetracycline HCl | 50 | 7.48 |
| Tetracycline HCl plus citric acid | 50+140 | 9.46 |
| Tetracycline HCl plus pyromellitic acid | 50+140 | 12.15 |
| Tetracycline HCl plus trimellitic acid 1,2-anhydride | 50+140 | 15.01 |

EXAMPLE 2

A group of three albino rats ranging from 175–300 grams were dosed with a solution or suspension of 50 mg./kg. of tetracycline hydrochloride via a feeding needle. A similar group of three rats received a mixture of 50 mg./kg. of tetracycline hydrochloride plus 50 mg./kg. of citric acid. A similar group received 50 mg./kg. of tetracycline hydrochloride plus 50 mg./kg. of pyromellitic acid. A smilar group received 50 mg./kg. of tetracycline hydrochloride plus 50 mg./kg. of trimellitic acid 1,2-anhydride. The serum levels were determined four hours after administration. The results obtained are shown in the table below:

*Table 2*

| Substance | Dose, mg./kg. | Serum Levels, mcg./ml. |
|---|---|---|
| Tetracycline HCl | 50 | 3.78 |
| Tetracycline HCl plus citric acid | 50+50 | 4.77 |
| Tetracycline HCl plus pyromellitic acid | 50+50 | 9.39 |
| Tetracycline HCl plus trimellitic acid 1,2-anhydride | 50+50 | 6.61 |

EXAMPLE 3

Groups of five albino rats ranging from 175–300 grams were dosed with a solution or suspension of 50 mg./kg. of 6-demethyltetracycline hydrochloride via a feeding needle. A similar group of five rats received a mixture of 50 mg./kg. of 6-demethyltetracycline hydrochloride plus 50 mg./kg. of citric acid. A similar group received 50 mg./kg. of 6-demethyltetracycline hydrochloride plus 50 mg./kg. of pyromellitic acid. A similar group received 50 mg./kg. of 6-demethyltetracycline hydrochloride plus 50 mg./kg. of trimellitic acid 1,2-anhydride. The serum levels were determined four hours after administration. The results obtained are shown in the table below:

*Table 3*

| Substance | Dose, mg./kg. | Serum Levels, mcg./ml. |
|---|---|---|
| Demethyltetracycline HCl | 50 | 2.80 |
| Demethyltetracycline HCl plus citric acid | 50+50 | 4.40 |
| Demethyltetracycline HCl plus pyromellitic acid | 50+50 | 7.24 |
| Demethyltetracycline HCl plus trimellitic acid 1,2-anhydride | 50+50 | 5.21 |

EXAMPLE 4

Groups of five albino rats ranging from 175–300 grams were dosed with a solution or suspension of 50 mg./kg. of 6-demethylchlortetracycline hydrochloride via a feeding needle. A similar group of five rats received a mixture of 50 mg./kg. of 6-demethylchlortetracycline hydrochloride plus 50 mg./kg. of citric acid. A similar group received 50 mg./kg. of 6-demethylchlortetracycline hydrochloride plus 50 mg./kg. of pyromellitic acid. A similar group received 50 mg./kg. of 6-demethylchlortetracycline hydrochloride plus 50 mg./kg. of trimellitic acid 1,2-anhydride. The serum levels were determined four hours after administration. The results obtained are shown in the table below:

*Table 4*

| Substance | Dose, mg./kg. | Serum Levels, mcg./ml. |
|---|---|---|
| Demethylchlortetracycline HCl | 50 | 4.92 |
| Demethylchlortetracycline HCl plus citric acid | 50+50 | 5.34 |
| Demethylchlortetracycline HCl plus pyromellitic acid | 50+50 | 5.82 |
| Demethylchlortetracycline HCl plus trimellitic acid 1,2-anhydride | 50+50 | 6.01 |

It will be noted that the adjuvants of this invention give much greater blood levels than does citric acid and about twice the blood levels obtained by the controls.

We claim:

1. A composition of matter comprising a tertacycline antibiotic and from 1 to 3 parts by weight of a compound of the group consisting of pyromellitic acid and trimellitic acid 1,2-anhydride as an oral potentiating agent therefor.
2. A composition according to claim 1 in which the antibiotic is chlortetracycline.
3. A composition according to claim 1 in which the antibiotic is tetracycline.
4. A composition according to claim 1 in which the antibiotic is oxytetracycline.
5. A composition according to claim 1 in which the antibiotic is 6-demethylchlortetracycline.
6. A comprosition according to claim 1 in which the antibiotic is 6-demethyltetracycline.
7. A method of increasing the absorption of a tetracycline antibiotic when administered orally which comprises the step of administering therewith from 1 to 3 parts by weight of a compound of the group consisting of pyromellitic acid and trimellitic acid 1,2-anhydride.
8. A method according to claim 7 in which the antibiotic is chlortetracycline.
9. A method according to claim 7 in which the antibiotic is tetracycline.
10. A method according to claim 7 in which the antibiotic is oxytetracycline.
11. A method according to claim 7 in which the antibiotic is 6-demethylchlortetracycline.
12. A method according to claim 7 in which the antibiotic is 6-demethyltetracycline.
13. An article of manufacture in dosage unit form suitable for oral administration comprising a mixture of from 25 to 500 milligrams of a tetracycline antibiotic and from 1 to 3 parts of a compound of the group consisting of pyromellitic acid and trimellitic acid 1,2-anhydride.

References Cited in the file of this patent

UNITED STATES PATENTS 2,906,666    Wirth _____ Sept. 29, 1959

OTHER REFERENCES

Boger et al.: "An Evaluation of Tetracycline Preparations," New England Journal of Medicine, 261 (17), pp. 827–832, Oct. 22, 1959.

Stempel: "Strides in the Development of the Tetracyclines," Am. J. Pharmacy, 134 (4), pp. 114–132, April 1962.